United States Patent [19]

Nomiyama

[11] Patent Number: 5,732,260
[45] Date of Patent: Mar. 24, 1998

[54] INFORMATION RETRIEVAL SYSTEM AND METHOD

[75] Inventor: Hiroshi Nomiyama, Kawaski, Japan

[73] Assignee: International Business Machines Corporation, Armonk, N.Y.

[21] Appl. No.: 521,701

[22] Filed: Aug. 31, 1995

[30] Foreign Application Priority Data

Sep. 1, 1994 [JP] Japan ................................. 6-208489

[51] Int. Cl.$^6$ ................................................ G06F 17/30
[52] U.S. Cl. .................... 395/605; 395/601; 395/606; 395/603
[58] Field of Search ........................ 395/605, 606, 395/601, 603

[56] References Cited

U.S. PATENT DOCUMENTS

| | | | |
|---|---|---|---|
| 3,168,565 | 2/1965 | Morita | 395/600 |
| 4,358,824 | 11/1982 | Glickman et al. | 364/200 |
| 5,400,436 | 3/1995 | Nara et al. | 395/13 |
| 5,418,951 | 5/1995 | Damashek | 395/600 |
| 5,499,360 | 3/1996 | Barbara et al. | 395/600 |
| 5,523,945 | 6/1996 | Satoh et al. | 364/419.08 |
| 5,535,382 | 7/1996 | Ogawa | 395/600 |
| 5,576,954 | 11/1996 | Driscoll | 395/603 |
| 5,598,557 | 1/1997 | Doner et al. | 395/605 |
| 5,640,553 | 6/1997 | Schultz | 395/605 |
| 5,649,221 | 7/1997 | Crawford et al. | 395/794 |

OTHER PUBLICATIONS

Frakes et al, An Empirical Study of Representation Methods for Reusable Software Components, IEEE, paes. 617–630 Aug. 1994.

Sakakibara, Text Classification and Keyword Extraction ny Learning Decision Trees, IEEE, p. 466 Mar. 1993.

*Primary Examiner*—Thomas G. Black
*Assistant Examiner*—Frantz Coby
*Attorney, Agent, or Firm*—Norman L. Gundel

[57] ABSTRACT

A technique for evaluating the topicality of keywords assigned to references retrieved from a database, so that interesting topics may be extracted. Since the number of references containing a specific keyword increases at a certain time and then gradually decreases with the passage of time, the topicality of a keyword can be evaluated by quantifying this phenomenon. Keywords are sorted based on the value of their topicality and displayed either as a list or as a graph in which the level of topicality is displayed along the time axis.

25 Claims, 3 Drawing Sheets

INFORMATION RETRIEVAL SYSTEM AND METHOD

FIELD OF THE INVENTION

The present invention is related to a technique for retrieving a database in which newspaper articles, patent publications, image information, and the like are held to be retrievable by a computer.

DESCRIPTION OF THE PRIOR ART

Conventionally, a database has been generally used in which newspaper articles, patent publications, and the like are held to be retrievable by a computer. In a such system, to facilitate the retrieval by an operator, a plurality of keywords is assigned for each element of a database (each article in a newspaper database and each patent publication in a patent database).

To carry out retrieval, an interactive retrieval method called a free keyword method is usually used. Since this enables retrieval results to be sequentially obtained as a user inputs keywords, it is advantageous for a skilled user to prepare some retrieval formulas and perform gradual focusing until a desired number of elements can be obtained. Such retrieval formulas usually include logical operations involving a number of conditions (AND, OR, NOT, etc.). However, the conventional method of this type does not make it possible to predict the degree of the effect of each condition on the result. In other words, to ensure that there is no omission other than the references found, it is required that, for each of the conditions used in the retrieval, verification be made for the difference between the case that is added and the case that is removed. However, in fact, the number of combinations of the logical expressions becomes very large, even if the retrieval becomes complex to slight degree, and thus such method is not effectively employable.

Further, since many retrieval systems are designed on the assumption that users are well informed about the information they are seeking and the fields related to it, focusing on several proper references from many retrieved references is difficult for users, other than specialists, who cannot think of appropriate keywords. Accordingly, there is a need for a system which enables users to determine the trend of the all references to be retrieved even if they do not have enough knowledge about the field of retrieval. There is a further need for a system which provides a group of keywords effective for retrieval to users, other than specialists, who cannot think of appropriate keywords, and navigates so that even users other than specialists can reach the information they are interested in. To do this, it is necessary to be able to evaluate the amount of information or topicality given by keywords, and, regarding this, such techniques as described in the following publications are available:

PUPA 63-49928 discloses that the frequency of use of keyword candidates and the likelihood of keyword candidates are calculated, and the likelihood is provided to each keyword candidate based on the frequency of use in a sentence.

PUPA 1-112331 discloses to a technique for automatically extracting keywords from newspaper articles and the like, and discloses how to evaluate keywords while also taking into consideration the statistical, constructional, and semantic importance of keywords in articles.

PUPA 2-158871 discloses that the amount of self-information of each keyword is calculated using the frequency of appearance value of keywords in a document database, and the amount of self-information is used to calculate the amount of conceptual characteristics for each document to determine the distance between documents according to the difference in the amount of conceptual characteristics among documents.

PUPA 4-98461 discloses that a word is extracted from English-language information, keyword candidates are created based on the extracted word and the memory content corresponding to the word, the importance of the keyword candidates is calculated based on the number of themes they appear, and a keyword is extracted from the keyword candidates based on the importance.

In accordance with these conventional techniques, a keyword is evaluated from the frequency of appearance of the keyword, and the contents in a document where the keyword appears. These criteria are generally effective in evaluating the weight of a keyword. That is, to create a thesaurus, keywords are discarded when their weights are evaluated to be smaller than a threshold value.

However, on the one hand, for instance, if a common keyword such as "semiconductor" or "$SiO_2$" is used in a technical reference database of semiconductor devices, a large number of references will be found.

On the other hand, it is very difficult to reach topical or epoch-making references from "common" keywords such as "semiconductor" and "$SiO_2$".

Conversely, if a rare keyword is used, an "uncommon" reference can be found as the case may be. It is not ensured at all, however, that such a uncommon reference is an important reference which deserves attention.

It is an object of the present invention to provide a technique for showing keywords to users who do not have sufficient knowledge about the field related to a reference database to be retrieved, which keyword enables such users to reach a significant or topical reference.

It is a further object of the present invention to provide a technique for evaluating the topicality of the plural keywords assigned to a retrieved reference.

It is a still further object to provide a technique for evaluating the topicality of the plural keywords assigned to a retrieved reference so that users can find out about an interesting topic.

SUMMARY IF THE INVENTION

To accomplish the above objects, paying attention to the fact that the number of references having a specific keyword increases at a certain time and gradually decreases along the time axis, the present inventor inferred that the topicality of the keyword can be evaluated by quantifying that phenomenon.

In particular, this is done as follows: That is, in accordance with the present invention, a model is assumed which has a frequency gradually decreasing from the time at which it peaks, the decrease of the frequency of a reference having a specific keyword along the time axis is compared with the model, and the specific keyword is regarded as a "topic," provided the distance between the model falls within a range which does not exceed a threshold value. Although a function assumed as the model must be substantially and monotonically decreased, it is not enough, but the absolute value of its gradient should gradually decrease. As a simple example of the function which satisfies this condition, there is the following:

$$y=1/x.$$

The first step is to determine the range in which the particular keyword is a topic. For this, it is necessary to estimate how frequently the particular keyword consistently appears. This is done for determining the so-called background frequency for the keyword and subtracting it from the obtained frequency, thereby to determine the true effect with time. By way of example, the background frequency can be expressed by the average of the lowest frequency and the second lowest frequency over a given period.

Thus, when the consistent frequency of appearance is determined, the time having the highest frequency to the consistent frequency of appearance in said given period is obtained, and it is taken as the beginning of the topic.

Next, the end of the topic is the time most distant from the beginning of the topic within the range in which the frequency of appearance of the reference having the particular keyword gradually decreases, and at which the frequency of appearance is still higher than the consistent frequency of appearance. If the frequency of appearance begins to increase from monotonically decreasing, or it becomes lower than the consistent frequency of appearance, the preceding time is regarded as the end of the topic.

When the beginning and end of the topic (referred as the duration of the topic) are determined, the topicality is calculated by using the product of the sum of the frequency of appearance of the particular keyword in the duration of the topic, and the degree of concentration of the topic in the duration for the whole given period (this is calculated, for instance, by dividing the sum of the frequencies of appearance of the particular keyword in the duration of the topic by the sum of the frequencies of appearance of the particular keyword over the whole given period).

By calculating the topicality for all of the extracted keywords and sorting them in descending order according to their values, the keywords can be evaluated by another criterion called "topicality" rather than by the number of times the keywords are found, and thus users can use high-ranking keywords sorted in this way to proceed to the retrieval of interesting references. In addition, simply by browsing through the group of keywords sorted in the way, users may roughly grasp what subjects the groups of related references have as their main topics.

Furthermore, when one keyword appears, sometimes another keyword appears substantially in correlation with it (for instance, "murder case" and "police"). Thus, a keyword very much related to another keyword, as such, does not show a topic, the understanding being that such keyword appears in association with the other keyword. Now, for instance, the correspondence of keyword F2 to keyword F1 is defined by dividing the frequency of a reference having both keywords by the frequency of a reference having keyword F1 and, preferably, those having such relativity greater than a predetermined threshold value are excluded from the list of topicality even if they are high-ranking keywords sorted by topicality. It may sometimes be desirable, however, for the keywords determined to be related to be written in parallel rather than being excluded from the list of topicality.

BRIEF DESCRIPTION OF THE DRAWINGS

The embodiment of the present invention is described below with reference to the drawings.

DESCRIPTION OF THE PREFERRED EMBODIMENT

A. Hardware Configuration

Figure 1:
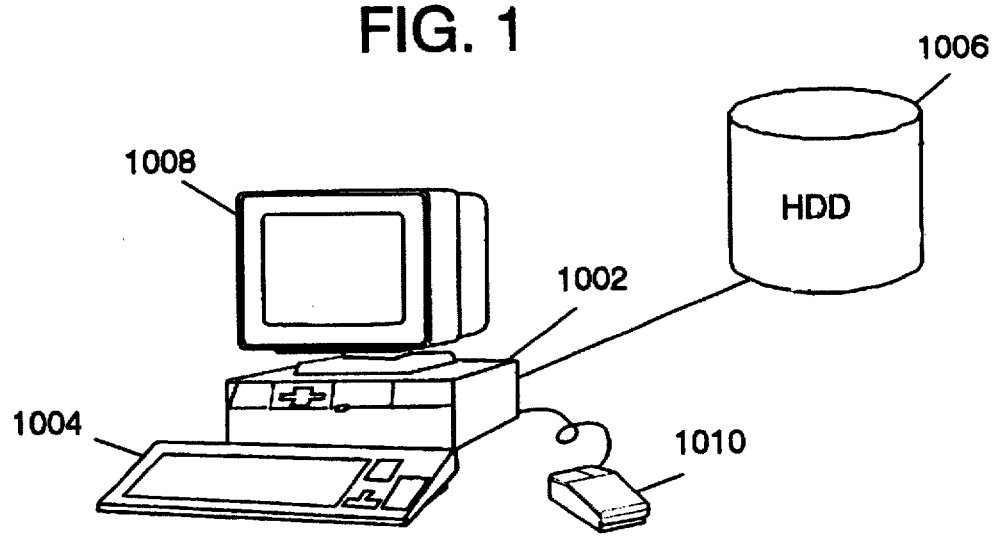
FIG. 1 is a schematic view showing a hardware configuration for implementing the present invention.

Referring to FIG. 1, a schematic view of a system configuration for embodying the present invention is shown. This configuration is not special, but is the conventional one which comprises a system unit 1002 including main memory (RAM), a central processing unit (CPU), a peripheral device controller, and the like, a keyboard 1004 for keying a command or character string into the system unit, a hard disk 1006 containing an operating system for controlling the central processing unit, a database file, a retrieval engine, and a keyword index file, a display device 1008 on which a retrieval result can be displayed in a color bit map, and a mouse 1010 for pointing to an arbitrary position on the screen of the display device 1008 and communicating the positional information to the central processing unit.

An operating system such as that which supports a GUI multiwindow environment as the standard specification is preferable, such as Windows (a trademark of Microsoft), OS/2 (a trademark of IBM), and the X-WINDOW system (a trademark of MIT) on AIX (a trademark of IBM), but the present invention can be implemented in the character base environment of MS-DOS (a trademark of Microsoft) and is not limited to any particular operating system.

In addition, although FIG. 1 shows a system in stand-alone environment, because a database file generally requires a mass storage disk device, and it may be possible that the present system is implemented as a client/server system, a database file and a retrieval engine are placed in the server machine, the client machine is connected through a LAN connection to the server machine by Ethernet, a token ring network, and the like, and only the GUI control section for observing the retrieval result is placed on the side of the client machine.

B. System Configuration

Figure 2:
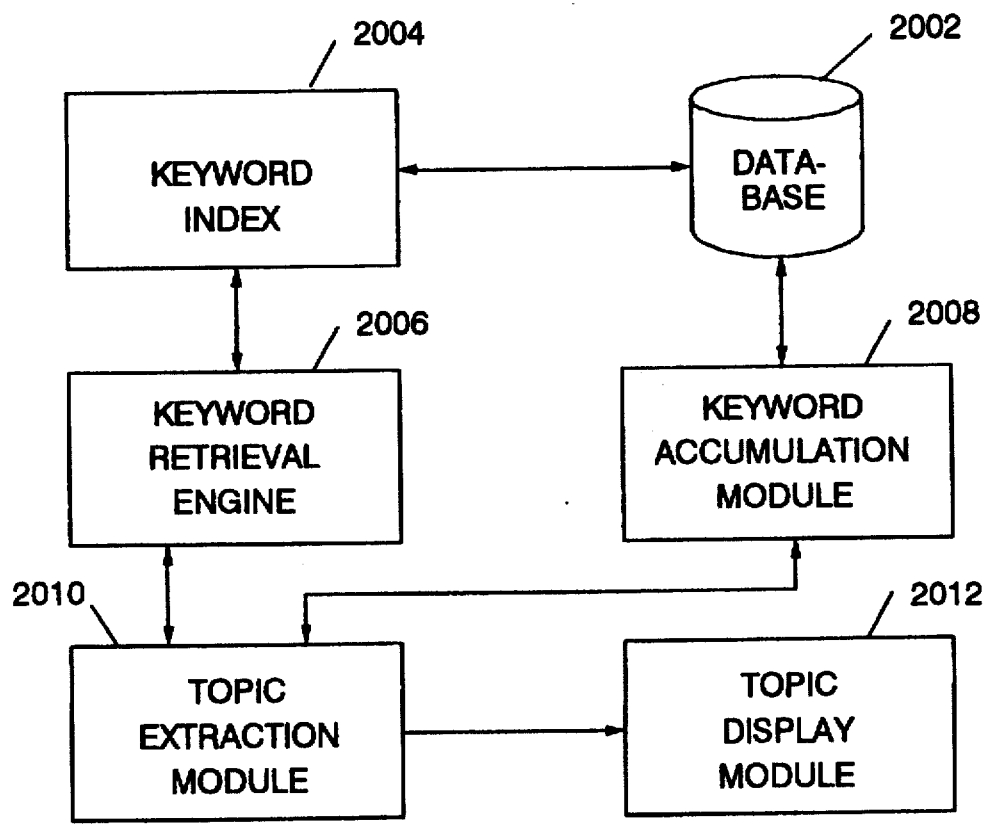
FIG. 2 is a block diagram of the logical construction for implementing the present invention.

The system configuration of the present invention is now described with reference to FIG. 2. It is to be noted that the elements represented by separate blocks in FIG. 2 are stored on the hard disk 1006 in FIG. 1 as separate data files or program files.

A database 2002 is a database of newspaper articles in this embodiment. In the database 2002, the contents of newspaper articles are stored in the form of a text file so that they can be independently retrieved. More specifically, each newspaper article is assigned a unique article number and the date when it appeared in the newspaper.

Since it generally takes a long time in processing to directly retrieve the contents of newspaper articles, a keyword index 2004 is prepared ahead of time for the contents of all of the newspaper articles stored in the database 2002. Every keyword and the numbers of the articles containing the particular keyword are stored in the keyword index 2004.

A keyword retrieval engine 2006 is used to retrieve the keyword index 2004 with a keyword as input, and return the article numbers of the articles containing the keyword input.

A keyword accumulation module 2008 accesses the contents of the articles stored in the database 2002 for instance with the set of the article numbers returned from the keyword retrieval engine 2006 as an result of a keyword retrieval as input, and returns the keywords assigned to those articles together with the dates upon which the articles containing it were carried.

A topic extraction module 2010 is used to directly access the database with a keyword as input, within the range of articles containing the keyword, to extract a topic, as will be described later in detail. The topic extraction module 2010 preferably has a function for sorting the extracted keywords according to topicality, as will also be described later in detail.

A topic display module 2012 is used to display the list of the keywords extracted by the topic extraction module 2010 as a topic on the display device 1008. The topic display module 2012 preferably has a function to provide a display as a bar graph, a line graph, or a pie chart on a GUI basis, in accordance with the frequency or dates on the extracted keywords.

C. Process of the Present Invention

The process of the present invention will be described next with reference to FIG. 3.

Figure 3:
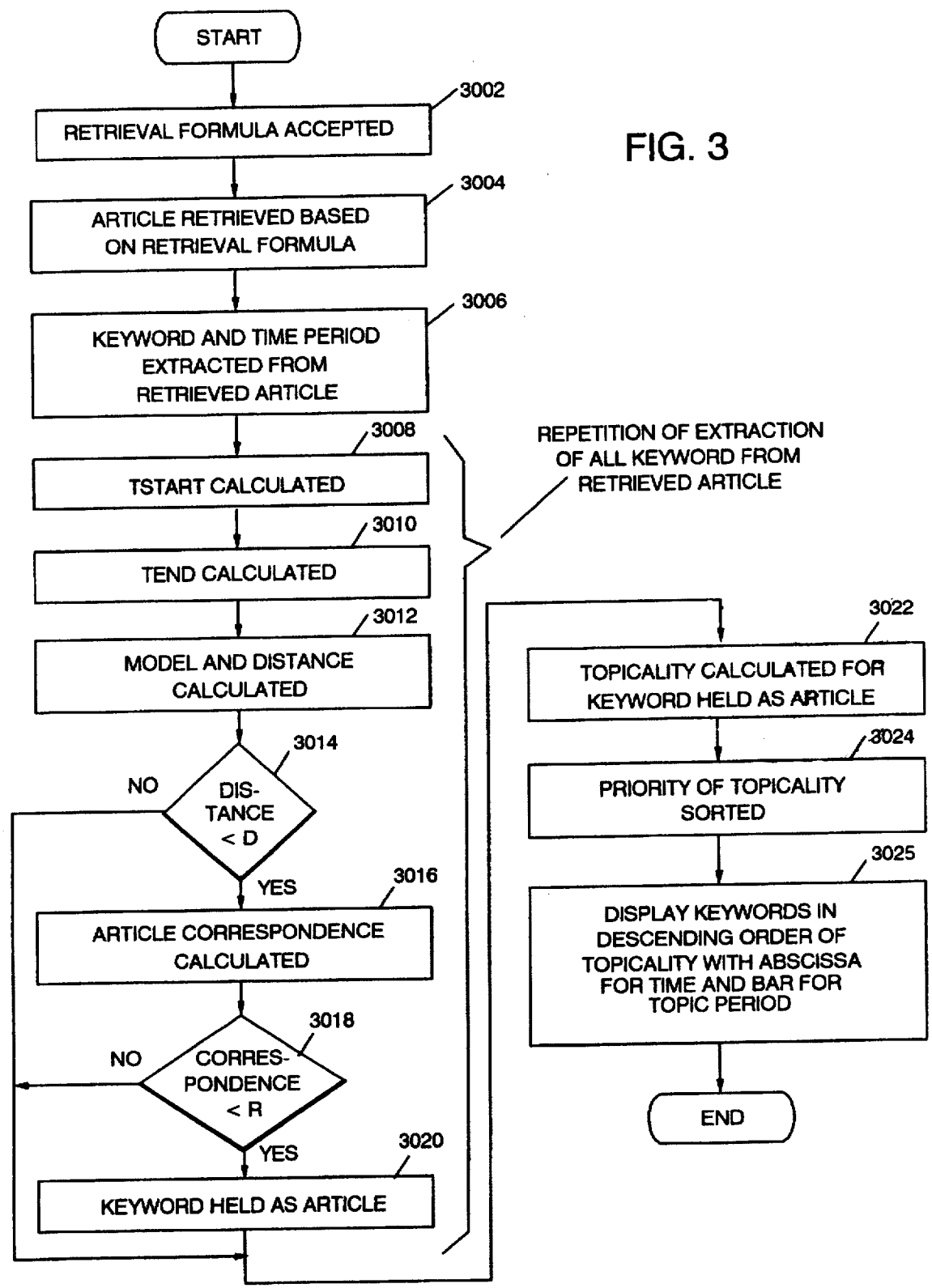
FIG. 3 is a flowchart for the process of the present invention.

First, in step 3002 in FIG. 3, the retrieval formula keyed in by the user from the keyboard is received by the keyword retrieval engine 2004 in FIG. 2. This retrieval formula may be a single keyword, or a plural keywords to which logical operators such as AND, OR, and NOT are related.

When the keyword retrieval engine 2004 receives the retrieval formula, it accesses the keyword index file 2004 stored in the disk 1006, in step 3004, to execute a retrieval. As a result of the retrieval, the keyword retrieval engine 2004 obtains the article number of an article corresponding to the retrieval formula.

The set of article numbers resulting from the retrieval is passed to the topic extraction module 2010.

The topic extraction module 2010 calls the keyword accumulation module 2008 with the set of article numbers as the retrieval result passed in this way, and thus, in step 3006, the keyword accumulation module 2008 directly accesses the contents corresponding to the article numbers as the retrieval result in the database 2002 and extracts keywords from the contents. With the extracted keywords, the dates of the source articles from which the keywords were extracted are associated for the process unique to the present invention.

In step 3008, the topic extraction module 2010 calculates the beginning of a topic Tstart for one keyword of the keywords extracted by the keyword accumulation module 2008. For this, firsts the topic extraction module 2010 performs the processing required for estimating how frequently the particular keyword consistently appears. This is done for determining the so-called background frequency (hereinafter, referred to as consistent frequency of appearance Fc) for the particular keyword and subtracting it from the obtained frequency, thereby to determine the true effect with time. In an embodiment, the consistent frequency of appearance Fc is calculated as the average of the lowest frequency and the second lowest frequency over a certain period. However, the consistent frequency of appearance may be provided as the lowest frequency over a certain period, and various calculation methods can be considered without departing from the purpose of the present invention.

When the consistent frequency of appearance Fc is determined in this way, the topic extraction module 2010 determines the time at which the highest frequency is provided for the consistent frequency of appearance in the above certain period, and defines it as the beginning of a topic.

Then, in step 3010, the topic extraction module 2010 calculates end of the topic Tend for the keyword as follows:

In an embodiment, the end of the topic is the time most distant from the beginning of the topic and at which the frequency of appearance of a reference having the keyword is higher than the consistent frequency of appearance, in the range in which it gradually decreases from the beginning of the topic. If the frequency of appearance changes in such a way as to increase from a monotonic decrease, or it becomes lower than the consistent frequency of appearance, the preceding time is the end of the topic.

In step 3012, the topic extraction module 2010 calculates the distance between a model based on the beginning Tstart and end Tend of the topic obtained above. For the model, the description is made with reference to the graph in FIG. 4.

Figure 4:
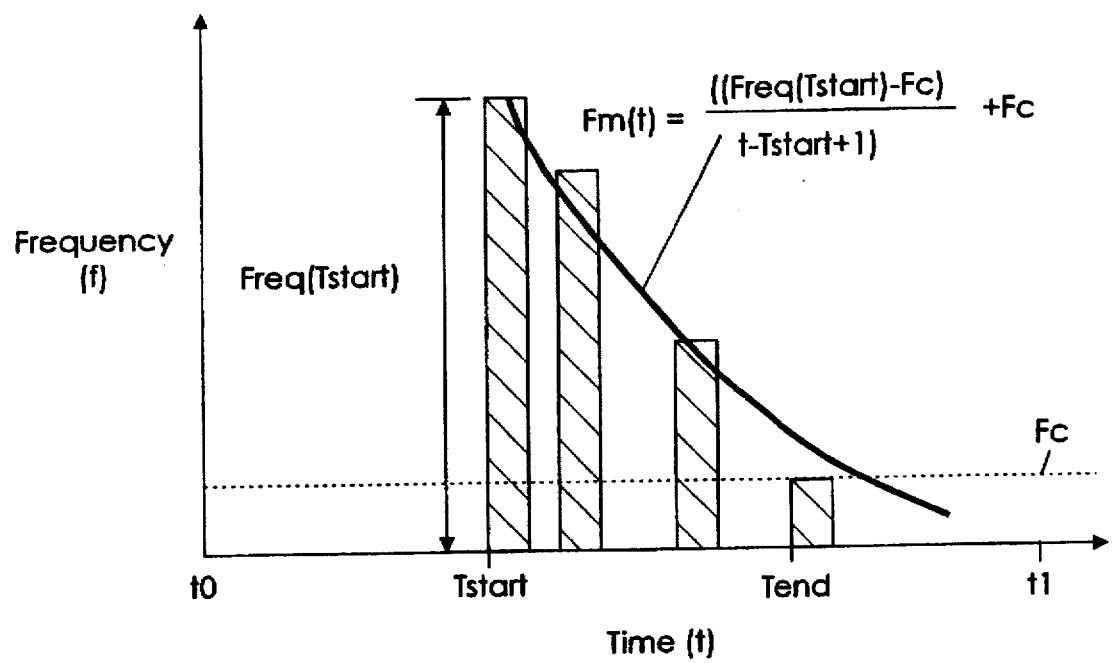
FIG. 4 is a graph showing a model and the change of frequency for extracting topically based on the present invention.

On the graph in FIG. 4, the abscissa is time t, and, in this case, the date when newspaper articles appeared. The ordinate is the number of newspaper articles containing the particular keyword within a unit of time (hereinafter, referred to as frequency f). For a newspaper article database, if the day is employed as the unit of time, the number of appearances per day varies relatively largely. On the one hand, however, there may be a possibility that useful information can be obtained from the variation of the number of articles from day to day, and thus it may be significant to employ the day as the unit of time. On the other hand, if the month is used as the unit of time for observing the frequency, the variations in the number of articles among days are averaged to increase the accuracy of topic extraction, but there is the possibility that small variations in the frequency are overlooked. Accordingly, as the unit of time, either the day or the month is chosen, depending on the purpose. Of course, another unit of time such as one week or three days may be suitable, as the case may be.

In FIG. 4, $t_0$ is the oldest date of an article in the entire newspaper article database, and $t_1$ is the newest date of an article in the entire newspaper article database.

In addition, Freq(t) is the frequency of the particular keyword at time t. By definition, Freq(Tstart) is the maximum frequency of the particular keyword.

According to one item of knowledge about the present invention, the ideal topic frequency follows a function which monotonically decreases and is characterized in that the absolute value of its negative gradient gradually decreases with time. The frequency estimated for such a function is called the model estimation amount. The characteristics of this topic model were recognized by the present inventor through the observation of the rise and fall in the frequency of many typical topics for actual newspaper articles.

One example of such a function is $y=1/x$, and another example is $y=1/(\log(x))$.

The description is made using an example in which $y=1/x$ is selected as the model. The model is normalized so that the value is Freq(Tstart) at t=Tstart, as the case may be. The equation Fm(t) of the model estimation amount is then as follows:

$$Fm(t) = (Freq(Tstart) - Fc)/(t - Tstart + 1) + Fc$$

In addition, depending on the case, constant K satisfying $0 < K < 1$ may be introduced to provide:

$$Fm(t) = K(t) * (Freq(Tstart) - Fc)/(t - Tstart + 1) + Fc.$$

Although this is not always normalized so that Fm(Tstart) =F(Tstart), it may provide a better model estimation amount over the period between Tstart and Tend. Incidentally, K(t) is a weight function which gradually decreases with t, and it is applied to provide greater importance to the first half of the topic period than the latter half of the topic period, based on the knowledge that a frequency which is not so important tends to occur in the latter half.

Returning to the flowchart in FIG. 3, in step 3012, the distance between the particular keyword and model estimation amount Fm is obtained by the following calculation:

$$d=0;$$

for (t=Tstart; t<=Tend; t+=unit of time)
if (Freq(t)>Fm(t))

$$d+=(Freq(t)-Fm(t))*(Freq(t)-Fm(t));$$

The distance is provided as the square root of the value d calculated in this way. Although the above expression follows the notation of C language for convenience, those skilled in the art should be capable of easily rewriting the above expression into any programming language such as FORTRAN, PASCAL, or BASIC.

In addition, the present invention is not limited to the above definition of distance, and another definition can be used as long as it does not deviate from the purpose of the present invention. For instance, in the above expression, $$d+=(Freq(t)-Fm(t)),(Freq(t)-Fm(t));$$

may be replaced by $$d+=abs(Freq(t)-Fm(t));$$

Incidentally, abs means a function for taking an absolute value. In this case, the distance is not the square root of d, but d itself is the distance.

When the distance between the model is thus calculated, it is determined in step 3014 whether the distance between the model is smaller than a predetermined threshold value D.

If so, for the point of the distance between the model, the particular keyword is regarded as having topicality, and the topic relativity is calculated in the next step, 3016. The topic relativity is an index of the degree to which the particular keyword occurs in association with another keyword, and it is calculated using the following equation:

The topic relativity (K1, K2)=Freq(K1 & K2)/Freq(K1)

In this equation, K1 is the particular keyword, and K2 is any one of the keywords extracted in step 3006 which is not equal to K1. In addition, Freq(K1 & K2) is the frequency of articles containing both K1 and K2. The time range for the calculation of this equation may be between $t_0$ and $t_1$ or between Tstart and Tend in FIG. 4. This equation takes a value between 0 and 1, and a value sufficiently near 1 means that K2 appears very often when K1 appears, providing the interpretation that K1 is strongly related to K2. For instance, "murder case" is a keyword strongly related to "police."

Even if a keyword strongly related to another keyword is marked as having topicality, as described above, it may very likely appear in articles only in association with the other keyword. Accordingly, in the preferred embodiment of the present invention, a keyword whose topic relativity is greater than threshold value R is not entered as a topic by the decision in step 3018, even if the distance between the model is determined to be smaller than D in Step 3014. However, this is merely one embodiment, and in another embodiment, even if it is determined to be strongly related to another keywords it may not be excluded from the list of topics and written in parallel with the other keyword determined to have a strong correspondences which may be more desirable, depending on the case.

If it is determined that the correspondence of the particular keyword with the other keyword is not large in step 3018, the keyword is at last held as a topic in step 3020.

It should be noted that steps 3008 to 3020 are sequentially performed for each of all the keywords extracted as keywords from newspaper articles in step 3006.

Then, in step 3022, the topicality is calculated for all of the keywords which are held. In accordance with the present invention, topicality is a value obtained by multiplying the accumulation of the frequencies of the particular keyword during a topic period, or the period from Tstart to Tend in FIG. 4, by the degree of concentration of the particular keyword during the entire period (from $t_0$ to $t_1$ in FIG. 4).

In an embodiment, the degree of concentration is a value obtained by dividing the frequency of the particular keyword during the topic period by the frequency of the particular keyword during the entire period.

Alternatively, a value obtained by dividing the length of the topic period by the length of the entire period may be used as the degree of concentration.

In step 3024, all of the keywords listed as a topic in step 3020 are sorted in descending order based on the value of topicality calculated in step 3022. This enables keywords to be sequentially displayed on the screen of the display device 1008 (FIG. starting with the keywords recognized to be more topical by the present invention, and this may be enough for the user to grasp at a glance the main topics of the group of articles focused on by the retrieval formula given in step 3002.

In step 3026, for several higher ranking keywords sorted in descending order with respect to topicality, a graph is displayed on the display device 1008 (FIG. 1) in which, when the abscissa represents time, a topic period is represented by a horizontal bar, and the height at which the bar appears is assumed to be the value of order of topicality (the bar is displayed higher when its order is higher). For a concrete example of such graph, reference is made to FIG. 5.

D. Concrete Retrieval Example

An example is now shown in which a retrieval is made by accessing an actual newspaper article database.

First, a newspaper article database covering a particular period was retrieved using the keyword "accident." Thereafter, when keywords were extracted from the obtained accumulation of articles and sorted in descending order with the number of time they appeared in the articles, the following list was obtained, listing the top 30 keywords, together with the sequence, keyword, and frequency, as follows:

TABLE 1

| | | |
|---|---|---|
| 1 | death | 362 |
| 2 | collision | 242 |
| 3 | cause | 194 |
| 4 | safety | 189 |
| 5 | company | 159 |
| 6 | spot | 137 |
| 7 | measures | 133 |
| 8 | work | 124 |
| 9 | mistake | 122 |
| 10 | occurrence | 122 |
| 11 | collision accident | 121 |
| 12 | explosion | 118 |
| 13 | prefectural police | 112 |
| 14 | mortality | 110 |
| 15 | prevention | 103 |
| 16 | investigation | 102 |
| 17 | liability | 90 |

TABLE 1-continued

| | | |
|---|---|---|
| 18 | damage | 89 |
| 19 | system | 87 |
| 20 | professional negligence resulting in death | 86 |
| 21 | accidental homicide | 82 |
| 22 | entire country | 81 |
| 23 | announcement | 81 |
| 24 | passenger | 80 |
| 25 | district court | 80 |
| 26 | compensation | 77 |
| 27 | nutram | 76 |
| 28 | cause of accident | 74 |
| 29 | company employee | 72 |
| 30 | runaway | 72 |

The following list was obtained by a sort in descending order for the accumulation of the same keywords according to the order of the calculated values of topicality (upper 30 were listed). This list shows the sequence, keyword, and value of topicality, as follows:

TABLE 2

| | | |
|---|---|---|
| 1 | nutram | 76.00 |
| 2 | runaway accident | 61.00 |
| 3 | runaway | 51.68 |
| 4 | transportation system | 51.00 |
| 5 | tanker accident | 44.33 |
| 6 | Sumatra | 44.02 |
| 7 | system | 37.34 |
| 8 | collision | 33.47 |
| 9 | collision accident | 28.77 |
| 10 | spot | 13.49 |
| 11 | explosion | 11.60 |
| 12 | injury | 10.88 |
| 13 | work | 9.88 |
| 14 | vehicles | 9.80 |
| 15 | entire country | 9.00 |
| 16 | facility | 9.00 |
| 17 | bereaved | 8.86 |
| 18 | investigation | 8.82 |
| 19 | occurrence | 7.87 |
| 20 | liability | 7.51 |
| 21 | mistake | 7.37 |
| 22 | resumption | 7.01 |
| 23 | corpse | 6.42 |
| 24 | professional negligence resulting in death | 6.15 |
| 25 | district court | 6.05 |
| 26 | accidental homicide | 5.90 |
| 27 | enforcement | 5.89 |
| 28 | technology | 5.67 |
| 29 | company employee | 5.55 |
| 30 | measures | 5.48 |

As seen from the above example, on the one hand, "death," having the highest frequency among the extracted keywords, is dropped from the list sorted in descending order by topicality, even from the top 30, and, thus, it is indicated that the single keyword "death" is not so topical at least in newspaper articles related to "accident."

On the other hand, the keyword "nutram," which was barely in the 27th rank in the list sorted in descending order by frequency was suddenly ranked as the top in the list sorted in descending order by topicality. The keyword "nutram" was certainly the most topical word, and this seems to prove the reliability of the technique of the present invention, in that such a keyword, having a relatively low frequency, can be listed as a keyword having a high topicality.

Furthermore, on the one hand, it is to be noted that, if extracted keywords are sorted merely based on frequency, only the keywords closely related to the retrieval condition provided first are extracted. For instance, in the above example, those words listed in upper ranks in the order of frequency by the retrieval condition "accident" are "death," "collision," "cause," "safety," etc., which can all be suggested to the average person by the keyword "accident." That is, based on the frequency alone, information which is not self-evident or significant to the user often is not given.

On the other hand, the keywords listed based on topicality were "nutram," "runaway accident," "runaway," "transportation system," "tanker accident," "Sumatra," and "systems" which, when compared with the above "death," "collision," "cause," and "safety," cannot easily be associated with the keyword "accident" without any presumptive knowledge. To put it another way, the present invention can automatically extract significant information and display it to the user, even though the user has no such presumptive knowledge.

In addition, after the calculation of topicality is completed, in response to a user's request or automatically, the list sorted in descending order by frequency is displayed in a specific window of the screen (in a multiwindow environment). By scrolling this window, the user can sequentially view keywords having a large topicality.

Figure 5:
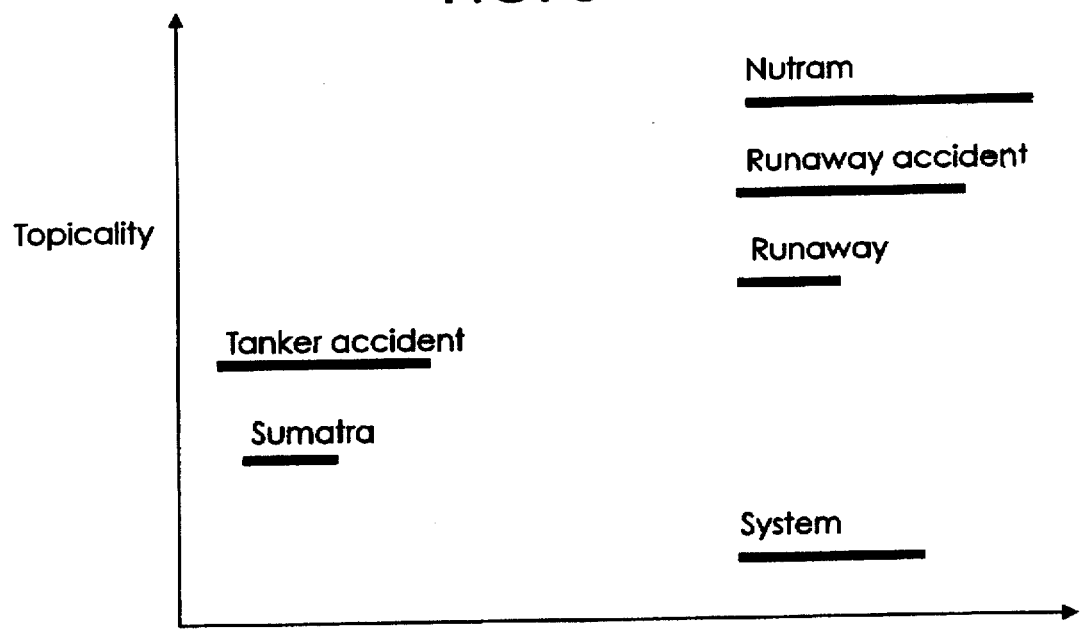
FIG. 5 is a figure showing an example of the screen for displaying extracted topics.

Moreover, after the calculation of topicality is completed, in response to a user's request or automatically, as shown in FIG. 5, with respect to several higher ranking keywords sorted in descending order by topicality, a graph is displayed on the display device 1008 (FIG. 1) in which the abscissa represents time, a topical period is a horizontal bar, and the level at which the bar appears is the order of topicality.

As described above, in accordance with the present invention, an advantage is obtained in that keywords can be selected and displayed based on the viewpoint of "topicality," which cannot be judged by the frequency of keywords.

In addition, although the description has been limited to a newspaper article database in the above embodiment, the present invention is not limited to the newspaper article database, but is applicable to any database which is maintained so as to be retrievable by using a computer, and in which keyword extraction from individual data elements is enabled and time (usually, the date) is associated with the individual data elements. As examples of these, there are electronic mail network forums (electronic bulletin boards), electronic proceedings, article databases, patent publication databases, and so on, in addition to newspaper article databases.

What is claimed is:

1. An information retrieval method for extracting topicality by a computer process from a database consisting of a plurality of data elements, each data element having time information and containing information that can be treated as keywords, said method comprising the steps of:

(a) determining the consistent frequency of appearance for a given keyword, said frequency being defined as an estimated number of data elements having time information within a unit of time, which data elements consistently contain said given keyword contained in said data elements over a predetermined period of said time information;

(b) along the axis of said time information, determining the time at which the value obtained by subtracting said consistent frequency of appearance from the number of data elements having time information for each unit of time, which data elements contain said given keyword, becomes maximum, as the beginning of the topicality of said given keyword;

(c) along the axis of said time information, determining the time later than the beginning of said topicality and at which the number of data elements having time information within a unit of time, which data elements contain said given keyword, becomes substantially as low as said consistent frequency of appearance, as the end of said topicality of said given keyword;

(d) previously providing a model as a function of change in the frequency of a topic, said function monotonically decreasing from the beginning to the end of a topic, said function characterized in that the absolute value of its negative gradient gradually decreases along said time axis;

(e) determining the distance between said function previously provided as a model and the graph of the change in a value obtained by subtracting said consistent frequency of appearance from the number of data elements having time information for each unit of time from said beginning to said end of said topicality; and (f) in response to the value of said distance for said given keyword being smaller than a threshold value, selecting said given keyword as a topic.

2. The information retrieval method as claimed in claim 1 wherein said function is a function in the form of $y=1/x$.

3. The information retrieval method as claimed in claim 1 further comprising the step of numerically determining the correspondence between said given keyword and another keyword contained in the data elements of said database, and, in response to said correspondence being greater than a predetermined threshold value, prohibiting said given keyword from being selected as a topic.

4. The information retrieval method as claimed in claim 3 wherein said correspondence is a value obtained by dividing the number of said data elements simultaneously containing said given keyword and said other keyword by the number of data elements containing said given keyword.

5. The information retrieval method as claimed in claim 1 wherein said database is a database of newspaper articles, said data elements are individual articles, and said time information is the date of issue.

6. An information retrieval method for extracting topicality by a computer process from a database consisting of a plurality of data elements, each data element having time information and containing information that can be treated as keywords, said method comprising the steps of:

(a) determining the consistent frequency of appearance for a given keyword, said frequency being defined as an estimated number of data elements having time information within a unit of time, which data elements consistently contain said given keyword contained in said data elements over a predetermined period of said time information;

(b) along the axis of said time information, determining the time at which the value obtained by subtracting said consistent frequency of appearance from the number of data elements having time information for each unit of time, which data elements contain said given keyword, becomes maximum, as the beginning of the topicality of said given keyword;

(c) along the axis of said time information, determining the time later than the beginning of said topicality and at which the number of data elements having time information within a unit of time, which data elements contain said given keyword, becomes substantially as low as said consistent frequency of appearance, as the end of topicality of said given keyword;

(d) previously providing a model as a function of change in the frequency of a topic, said function monotonically decreasing from the beginning to the end of a topic, said function characterized in that the absolute value of its negative gradient gradually decreases along said time axis;

(e) determining the distance between said function previously provided as a model and the graph of the change in a value obtained by subtracting said consistent frequency of appearance from the number of data elements having time information for each unit of time from said beginning to said end of said topicality;

(f) in response to the value of said distance for said given keyword being smaller than a threshold value, selecting said given keyword as a topic; and (g) applying said steps (a) to (f) to each of a plurality of keywords contained in the data elements of said database, and sorting in descending order those selected as a topic from said plurality of keywords, with the value of said distance.

7. The information retrieval method as claimed in claim 6 further comprising the step of numerically determining the correspondence between said given keyword and another keyword contained in the data elements of said database, and, in response to said correspondence being greater than a predetermined threshold value, prohibiting said given keyword from being selected as a topic.

8. The information retrieval method as claimed in claim 7 wherein said correspondence is a value obtained by dividing the number of said data elements simultaneously containing said given keyword and said other keyword by the number of data elements containing said given keyword.

9. The information retrieval method as claimed in claim 6 wherein said database is a database of newspaper articles, said data elements are individual articles, and said time information is the date of issue.

10. The information retrieval method as claimed in claim 9 wherein said unit of time is the month.

11. An information retrieval system for extracting topicality by a computer process from a database consisting of a plurality of data elements, each data element having time information and containing information that can be treated as keywords, said system comprising:

(a) means for determining the consistent frequency of appearance for a given keyword, said frequency being defined as an estimated number of data elements having time information within a unit of time, which data elements consistently contain said given keyword contained in said data elements over a predetermined period of said time information;

(b) means for determining, along the axis of said time information, the time at which the value obtained by subtracting said consistent frequency of appearance from the number of data elements having time information for each unit of time, which data elements contain said given keyword, becomes maximum, as the beginning of said topicality of said given keyword;

(c) means for determining, along the axis of said time information, the time later than the beginning of said topicality and at which the number of data elements having time information within a unit of time, which data elements contain said given keyword, becomes substantially as low as said consistent frequency of appearance, as the end of said topicality of said given keyword;

(d) means for determining the distance between a function of change in a topic frequency, said function being previously provided as a model and monotonically decreasing from the beginning to the end of a topic, said function characterized in that the absolute value of its negative gradient gradually decreases along said time axis, and the graph of the change in a value obtained by subtracting said consistent frequency of appearance from the number of data elements having time information for each unit of time from said beginning to said end of said topicality; and (e) means responsive to the value of said distance for said given keyword being smaller than a threshold value for selecting said given keyword as a topic.

12. The information retrieval system as claimed in claim 11 further comprising:

means for holding the plurality of keywords selected as a topic by said means for selecting a keyword as a topic;

means for calculating said topicality for said plurality of keywords that are held, as the product of the frequency of the data elements containing said keywords and having time information between the beginning and the end of said topic, and the degree of concentration of said keywords within said predetermined period of said keywords; and means for sorting said plurality of keywords with the value of said topicality and showing them to a user.

13. The information retrieval system as claimed in claim 12 wherein said degree of concentration is a value which is proportional to a value obtained by dividing the frequency of the data elements having time information between the beginning and the end of said topic by the frequency of the data elements having time information within said predetermined period.

14. The information retrieval system as claimed in claim 11 wherein said means for selecting said given keyword as topic further comprises means for numerically determining the correspondence between said given keyword and another keyword contained in the data elements of said database, and, in response to said correspondence being greater than a predetermined threshold value, prohibiting said given keyword from being selected as a topic.

15. The information retrieval system as claimed in claim 14 wherein said correspondence is a value obtained by dividing the number of said data elements simultaneously containing said given keyword and said other keyword by the number of data elements containing said given keyword.

16. The information retrieval system as claimed in claim 11 wherein said database is a database of newspaper articles, said data elements are individual articles, and said time information is the date of issue.

17. The information retrieval system as claimed in claim 16 wherein said unit of time is either a month or a day.

18. An information retrieval system for extracting topicality by a computer process from a database consisting of a plurality of data elements, each data element having time information and containing information that can be treated as keywords, said system comprising:

(a) retrieval means responsive to a retrieval demand from a user for retrieving data elements fulfilling the condition of said retrieval demand in said database, (b) means for determining the consistent frequency of appearance for a given keyword which is consistently contained in said data elements retrieved by said retrieval means over a predetermined period of said time information, said frequency being defined as an estimated number of data elements having time information within a unit of time, which data elements consistently contain said keyword;

(c) means for determining, along the axis of said time information, the time at which the value obtained by subtracting said consistent frequency of appearance from the number of data elements having time information for each unit of time, which data elements contain said given keyword, becomes maximum, as the beginning of said topicality of said given keyword;

(d) means for determining, along the axis of said time information, the time later than the beginning of said topicality and at which the number of data elements having time information within a unit of time, which data elements contain said given keyword, becomes substantially as low as said consistent frequency of appearance, as the end of said topicality of said given keyword;

(e) means for determining the distance between a function of change in a topic frequency, said function being previously provided as a model and monotonically decreasing from the beginning to the end of a topic, said function characterized in that the absolute value of its negative gradient gradually decreases along said time axis, and the graph of the change in a value obtained by subtracting said consistent frequency of appearance from the number of data elements having time information for each unit of time from said beginning to said end of said topicality;

(f) means responsive to the value of said distance for said given keyword being smaller than a threshold value for selecting said given keyword as a topic; and (g) means for listing said keywords selected as a topic in the set of data elements retrieved by said retrieval means and displaying them to the user.

19. The information retrieval system as claimed in claim 18 wherein said means for listing keywords and displaying them to the user further comprises:

means for calculating said topicality for said keywords as the product of the frequency of the data elements containing said keywords and having time information between the beginning and the end of said topic, and the degree of concentration of said keywords within said predetermined period of said keywords; and means for sorting said keywords with the value of said topicality and showing them to the user.

20. The information retrieval system as claimed in claim 19 wherein said degree of concentration is a value which is proportional to a value obtained by dividing the frequency of the data elements having time information between the beginning and the end of said topic by the frequency of the data elements having time information within said predetermined period.

21. The information retrieval system as claimed in claim 19 further comprising means for displaying keywords ranking higher in the value of said topicality as a horizontal bar extending between the beginning and the end of the topicality of said keyword, with the abscissa representing the period and the ordinate representing the order of the topicality.

22. The information retrieval system as claimed in claim 18 wherein said means for selecting said given keyword as topic further comprises means for numerically determining the correspondence between said given keyword and another keyword contained in the data elements of said database, and, in response to said correspondence being greater than a predetermined threshold value, prohibiting said given keyword from being selected as a topic.

23. The information retrieval system as claimed in claim 22 wherein said correspondence is a value obtained by dividing the number of said data elements simultaneously containing said given keyword and said other keyword by the number of data elements containing said given keyword.

24. The information retrieval system as claimed in claim 18 wherein said database is a database of newspaper articles, said data elements are individual articles, and said time information is the date of issue.

25. The information retrieval system as claimed in claim 24 wherein said unit of time is either a month or a day.

* * * * *